US006691282B1

(12) United States Patent
Rochford et al.

(10) Patent No.: US 6,691,282 B1
(45) Date of Patent: Feb. 10, 2004

(54) METHOD AND APPARATUS FOR DISPLAYING AND NAVIGATING CONTAINMENT HIERARCHIES

(75) Inventors: Suzanne L. Rochford, Hull (CA); Allan Wille, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/337,536

(22) Filed: Jun. 22, 1999

(51) Int. Cl.[7] ............................................. G06F 15/00
(52) U.S. Cl. ........................ 715/514; 345/853; 345/854; 715/500
(58) Field of Search ............................. 707/500.1, 514, 707/515, 205; 345/841, 854, 853; 715/514, 515, 500

(56) References Cited

U.S. PATENT DOCUMENTS

| | | | |
|---|---|---|---|
| 3,292,489 A | * 12/1966 | Johnson et al. | 345/854 |
| 4,710,763 A | 12/1987 | Franke et al. | 340/723 |
| 5,065,347 A | 11/1991 | Pajak et al. | 395/159 |
| 5,263,174 A | * 11/1993 | Layman | 345/853 |
| 5,644,334 A | * 7/1997 | Jones et al. | 345/419 |
| 5,682,525 A | 10/1997 | Bouve et al. | 395/615 |
| 5,701,137 A | * 12/1997 | Kiernan et al. | 345/853 |
| 5,714,971 A | 2/1998 | Shalit et al. | 345/119 |
| 5,790,121 A | * 8/1998 | Sklar et al. | 345/853 |
| 5,838,319 A | 11/1998 | Guzak et al. | 345/340 |
| 5,923,328 A | * 7/1999 | Griesmer | 345/769 |
| 6,035,330 A | * 3/2000 | Astiz et al. | 345/738 |
| 6,098,072 A | * 8/2000 | Sluiman et al. | 707/100 |
| 6,148,311 A | * 11/2000 | Wishnie et al. | 345/760 |
| 6,236,400 B1 | * 5/2001 | Guerrero | 345/841 |
| 6,252,597 B1 | * 6/2001 | Lokuge | 345/841 |
| 6,341,280 B1 | * 1/2002 | Glass et al. | 353/25 |
| 6,348,935 B1 | * 2/2002 | Malacinski et al. | 345/853 |
| 6,380,947 B1 | * 4/2002 | Stead | 345/645 |
| 6,427,232 B1 | * 7/2002 | Ku et al. | 717/124 |
| 6,484,190 B1 | * 11/2002 | Cordes et al. | 345/809 |

OTHER PUBLICATIONS

Bay Networks, Inc., Apr. 1998, "Using Optivity Network Management System 8.1 Internetwork Applications", Chapters 3 and 4.

"Telecom Operations Map", Telemanagement Forum, Evaluation Version 1.1, Apr. 1999, p. iii to xxii and 1 to 49.

* cited by examiner

Primary Examiner—Stephen S. Hong
Assistant Examiner—Cong Lac T. Huynh

(57) ABSTRACT

A method for use in a computer system for displaying a containment group such as file folder hierarchy. The method displays a direct containment hierarchy for the selected containment group or file folder, and also displays a list of contents of the selected containment group or file folder. A direct containment hierarchy displays only file folders or containment groups which directly or indirectly contain the selected containment group or file folder. In this manner a large number of file folders or containment groups which do not ultimately contain the selected file folder or containment group are not displayed, thereby simplifying the display, and ensuring that the entire direct containment hierarchy can be shown on a single display screen without the need for scrolling in order to obtain or ascertain the context of the given file folder or containment group.

24 Claims, 10 Drawing Sheets

WORLD
    AFRICA
        SOUTH AFRICA
    ASIA
    AUSTRALIA
        JAPAN
        CHINA
    EUROPE
        FRANCE
        UNITED KINGDOM
        GERMANY
    NORTH AMERICA
        CANADA
            NEWFOUNDLAND
            NEW BRUNSWICK
            NOVA SCOTIA
            PRINCE EDWARD ISLAND
            QUEBEC
            ONTARIO
                CENTRAL ONTARIO
                    BARRY
                        AREA1
                        AREA2
                        AREA3
                    HAMILTON
                        AREA1
                        AREA2
                        AREA3
                    MILTON
                        AREA1

FIG. 1

AREA2  
        AREA3  
    OAKVILLE  
        AREA1  
        AREA2  
        AREA3  
    OSHAWA  
    SCARBOROUGH  
    TORONTO  
        AREA1  
        AREA2  
        AREA3  
        AREA4  
    EASTERN ONTARIO  
    NORTHERN ONTARIO  
    SOUTHERN ONTARIO  
  MANITOBA  
  SASKATCHEWAN  
  ALBERTA  
  BRITISH COLUMBIA  
UNITED STATES  
MEXICO  
SOUTH AMERICA

FIG. 1A

WORLD
    AFRICA
    ASIA
    AUSTRALIA
    EUROPE
    NORTH AMERICA
        CANADA
            NEW FOUNDLAND
            NEW BRUNSWICK
            NOVA SCOTIA
            PRINCE EDWARD ISLAND
            QUEBEC
            ONTARIO
                CENTRAL ONTARIO
                    BARRY
                    HAMILTON
                    MILTON
                    OAKVILLE
                    OSHAWA
                    SCARBOROUGH
                    TORONTO
                        AREA1
                        AREA2
                        AREA3
                        AREA4
                EASTERN ONTARIO
                NORTHERN ONTARIO
                SOUTHERN ONTARIO
            MANITOBA
            SASKATCHEWAN
            ALBERTA

FIG. 2

BRITISH COLUMBIA
UNITED STATES
MEXICO
SOUTH AMERICA

METHOD AND APPARATUS FOR DISPLAYING AND NAVIGATING CONTAINMENT HIERARCHIES

FIELD OF THE INVENTION

The invention relates to a method and apparatus for displaying and navigating containment hierarchies such as file folder containment hierarchies, and more particularly to a system and method facilitating on-screen navigation through a file folder hierarchy which has a substantial containment level and a large file folder size.

BACKGROUND OF THE INVENTION

Computers typically use directories or file folders to store files, thereby allowing files having some common characteristic to be stored together and accessed as a group. A top-level file folder may be considered as containing all the files on a given device, for example a hard disk or floppy drive. The top-level file folder then contains a containment hierarchy of file folders with each file folder containing file folders lower in the hierarchy, and/or files. A file folder which contains another file folder or file is referred to as a parent, while the file folders and/or files contained in a parent file folder are that file folder's children. Children files and file folders are each other's siblings. A file folder containing only files, and no file folders is a bottom-level file folder. The number of containments between a file in a bottom-level file folder and the top-level file folder is the containment depth for that file, and the number of files and file folders directly contained within a file folder is that file folder's size, also referred to as width or breadth.

Various graphical user interfaces have been adopted for navigating through the containment hierarchy of file folders, the most common being that used in MICROSOFT's Windows* based software such as File Manager and Windows Explorer. In these products, when a file folder having a "+" indicator (indicating it contains at least one file folder) is selected, a complete list of the file folder's children file folders is added to a displayed hierarchy in a left display window, and any children files contained in the file folder are displayed in a right display window. Other rules come into play when a device is selected. When a file folder from the list of children file folders is selected, a complete list of that file folder's children file folders contained in the selected file folder is added to the displayed hierarchy in the left display window, and so on. Windows provides various mechanisms for hiding the details of a file folder and for controlling somewhat what is displayed in the left window and the right window. These approaches work very well when the containment hierarchy has a small depth and a small breadth, but are cumbersome and inconvenient to use when one or both of these two characteristics are not true. This is because the containment hierarchy in combination with a large breadth (file folder size) may result in potentially relevant portions of the display being scrolled out of view, such that a user loses the ability to directly ascertain the containment or context of what is being displayed. More particularly, if the file folder of interest is in a large group of file folders at the same level in the hierarchy and contained within a single higher level parent file folder, Windows provides no way to focus on the file folder of interest to the exclusion of the others in the parent file folder. Suppose for example, the *Trademark file folder of interest is at the bottom of a list of one hundred file folders in a parent file folder, the hierarchy, or "context" of this parent file folder will scroll off the screen when a user moves down to the file folder of interest.

Another disadvantage of existing systems is that as the number of file folders opened increases, the display becomes cluttered making navigation to a new point in the hierarchy difficult. As a result the user is required to close up file folders when they want to navigate to new point.

It would be desirable to be able to navigate through a file folder containment hierarchy in a manner which allows the context of what is being observed to be continuously clear.

SUMMARY OF THE INVENTION

It is an object of the invention to obviate or mitigate one or more of the above identified disadvantages.

According to a broad aspect, the invention provides a method for use in a computer system for displaying a containment hierarchy such as a file folder hierarchy. The method displays a direct containment hierarchy for a selected containment group or file folder, and also displays a list of contents of one of the containment groups or file folders in the direct containment hierarchy. A direct containment hierarchy displays only file folders or containment groups which directly or indirectly contain the selected containment group or file folder. In this manner a large number of file folders or containment groups which do not ultimately contain the selected file folder or containment group are not displayed, thereby simplifying the display, and ensuring that the entire direct containment hierarchy can be shown on a single display screen without the need for scrolling in order to obtain or ascertain the context of the given file folder or containment group.

Preferably, the list of contents of the selected file folder or containment group is searchable to allow a user to quickly focus in upon files or file folders having names satisfying search criterion entered by the user.

Preferably, a pictorial representation of the selected file folder's position with the direct containment hierarchy is provided. A skilled user can then select files or file folders by using the pictorial representation rather than the textual representation, this in some cases allowing a quicker selection process to be realized.

In other embodiments of the invention, a computer system, a graphical user interface, an operating system, and a computer readable medium are respectively provided each of which have been adapted to implement one or more of the above discussed methods.

BRIEF DESCRIPTION OF THE DRAWINGS

Preferred embodiments of the invention will now be described with reference to the attached drawings in which:

FIG. 1 is an example of a containment hierarchy;

FIG. 2 is an example of how conventional products would display the hierarchy of a particular file in the example containment hierarchy of FIG. 1;

FIGS. 4A through 4E are a sequence of figures illustrating how the display of FIG. 3 was arrived at;

DETAILED DESCRIPTION OF THE PREFERRED EMBODIMENTS

Figure 9:
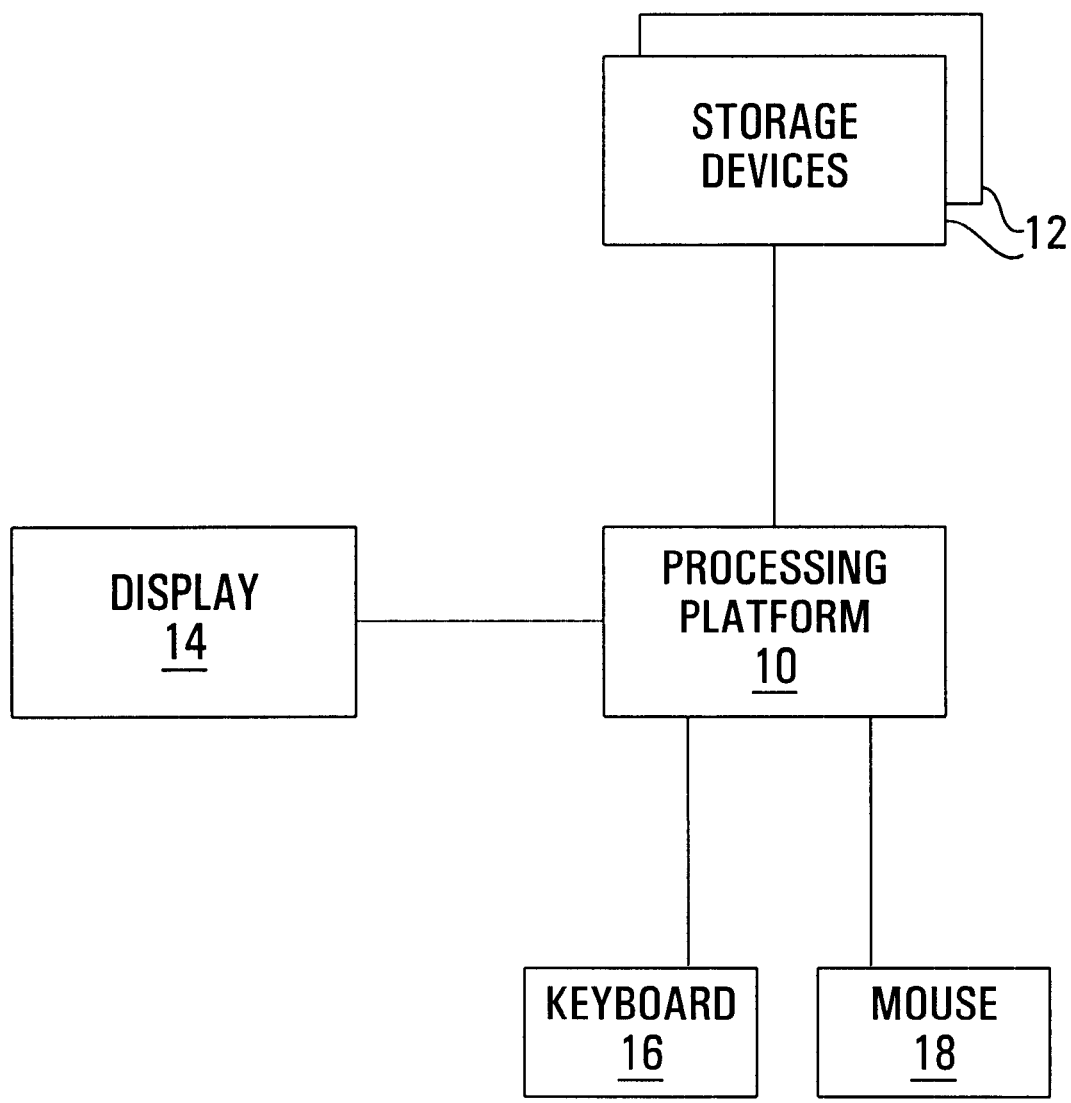
FIG. 9 is an example of a computer system for implementing methods provided by the invention.

An example of a computer system by which embodiments of the invention may be provided or implemented is depicted in block diagram form in FIG. 9. A processing platform 10 such as a personal computer is shown connected to storage devices 12 (two shown), a display 14, a keyboard 16 and a mouse 18. The processing platform 10 has an operating system which is aware of or can ascertain the files stored on the storage devices 12 and knows their hierarchical containment.

Now, a few definitions will be given.

FILE FOLDER: any mechanism for providing logical or physical containment of files;

FILE: a logical or physical entity which does not have any containment;

CONTAINMENT DEPTH: the term "containment depth" will be used to refer to a numeric value which identifies inclusively the number of containments between a file folder and a top-level file folder. Thus, a file folder with a containment depth of "3" with respect to the top-level file folder for example, is contained in another file folder which is contained in the top-level file folder.

PARENT: a file folder which contains other file folders and/or files;

CHILD,CHILDREN: files or file folders contained in a parent file folder;

SIBLINGS: the name of files or file folders contained in the same parent, as they relate to each other.

A method displaying a file folder hierarchy according to an embodiment of the invention will be described by way of example for a particular arrangement of files and file folders which is illustrated graphically in FIG. 1. Indentation in FIG. 1 means containment. Thus, for example, "WORLD" contains "AFRICA", "ASIA", "AUSTRALIA", "EUROPE", "NORTH AMERICA" and "SOUTH AMERICA". In FIG. 1, file folders are indicated in bold, and regular files are not indicated in bold. Let us assume that we are interested in the contents of the file folder "TORONTO". For the sake of comparison, an example of the most concise hierarchy which might be displayed in conventional "Windows" based applications is illustrated in FIG. 2. The first thing one notices is that FIG. 2 includes the display of 34 file folders and files. Disadvantageously, there is no way to hide details of file folders contained in the same file folder as a file folder which contains directly or indirectly the file folder of interest. For example, although we are interested in "TORONTO", the display always includes file folders contained in "CENTRAL ONTARIO", in this case "BARRY", "HAMILTON", "MILTON", "OAKVILLE", "OSHAWA", and "SCARBOROUGH". This results in the lengthy display of FIG. 2, which when presented on a display screen, would likely result in the top portion of the hierarchy scrolling off the screen.

Figures 2A, 3:
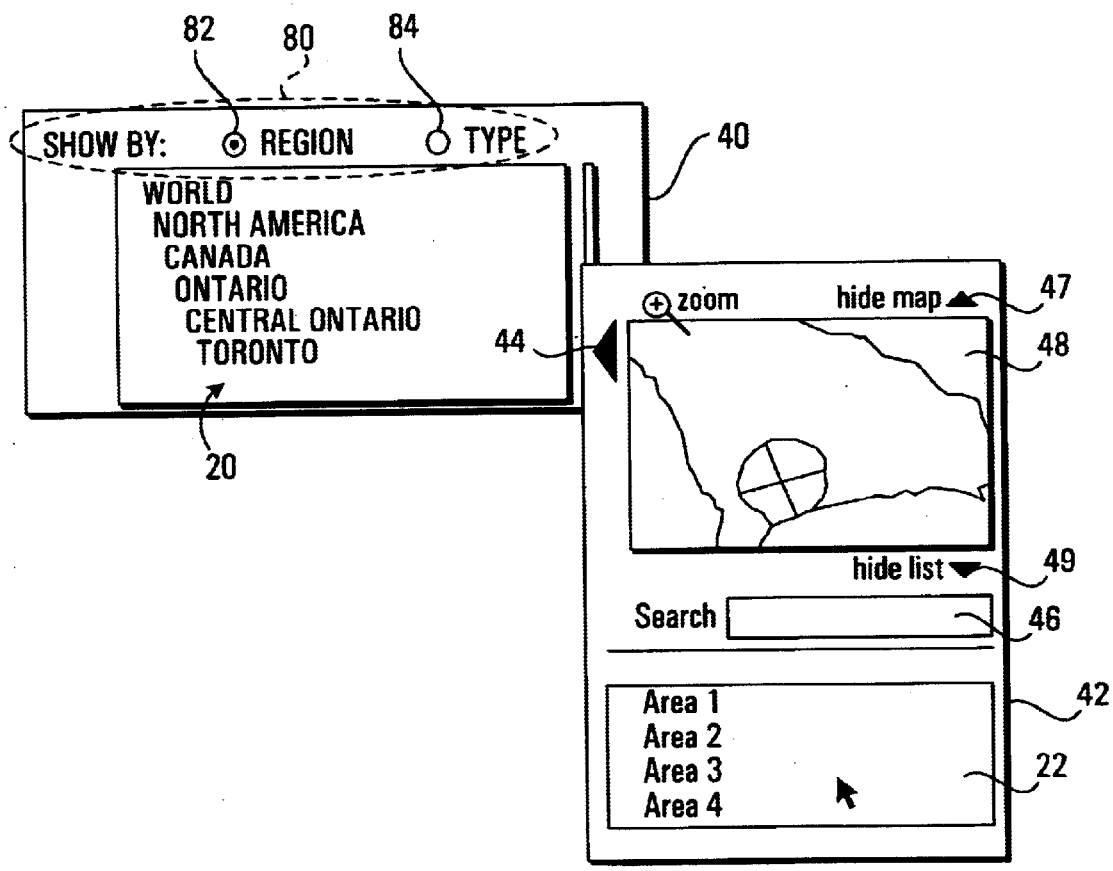
FIG. 3 is an example of a display of a file folder hierarchy of a particular file folder in the example containment hierarchy of FIG. 2 according to an embodiment of the invention.

Referring now to FIG. 3, according to an embodiment of the invention, a computer system (for example the system of FIG. 9) is adapted to implement a method which displays the hierarchy for a selected file folder, (for example file folder "ONTARIO" in FIG. 1), by displaying a direct containment hierarchy 20 for that file folder, and by displaying a list of contents 22 of the selected file folder. In the illustrated example, the direct containment hierarchy 20 consists of the sequence of file folders "WORLD", "NORTH AMERICA", "CANADA", "ONTARIO", "CENTRAL ONTARIO", and "TORONTO". A direct containment hierarchy 20 consists of some top-level file folder, in this case "WORLD", and then a sequence of child file folders, one at each containment depth down to and including a lowest-selected file folder, in this case "TORONTO". As in this example, the sequence might end at a lowest-selected file folder which is a bottom-level file folder, but this need not be the case. The direct containment hierarchy 20 only includes the file folders which lead directly to the selected file folder. Thus, for the illustrated example, the child file folders contained by "WORLD" in addition to "NORTH AMERICA" are not displayed (as they are in prior art example of FIG. 2), the child file folders contained by "NORTH AMERICA" in addition to "CANADA" are not displayed (as they are in the prior art example of FIG. 2), the child file folders contained by "CANADA" other than "ONTARIO" are not displayed (as they are in the prior art example of FIG. 2), the child file folders contained by "ONTARIO" other than "CENTRAL ONTARIO" are not displayed (as they are in the prior art example of FIG. 2), and the child file folders contained by "CENTRAL ONTARIO" other than "TORONTO" are not displayed (as they are in the prior art example of FIG. 2). The result is a concise display of the hierarchy of the file folder "TORONTO" which can be immediately discerned directly from the display without the need to perform any scrolling.

Figure 4A:
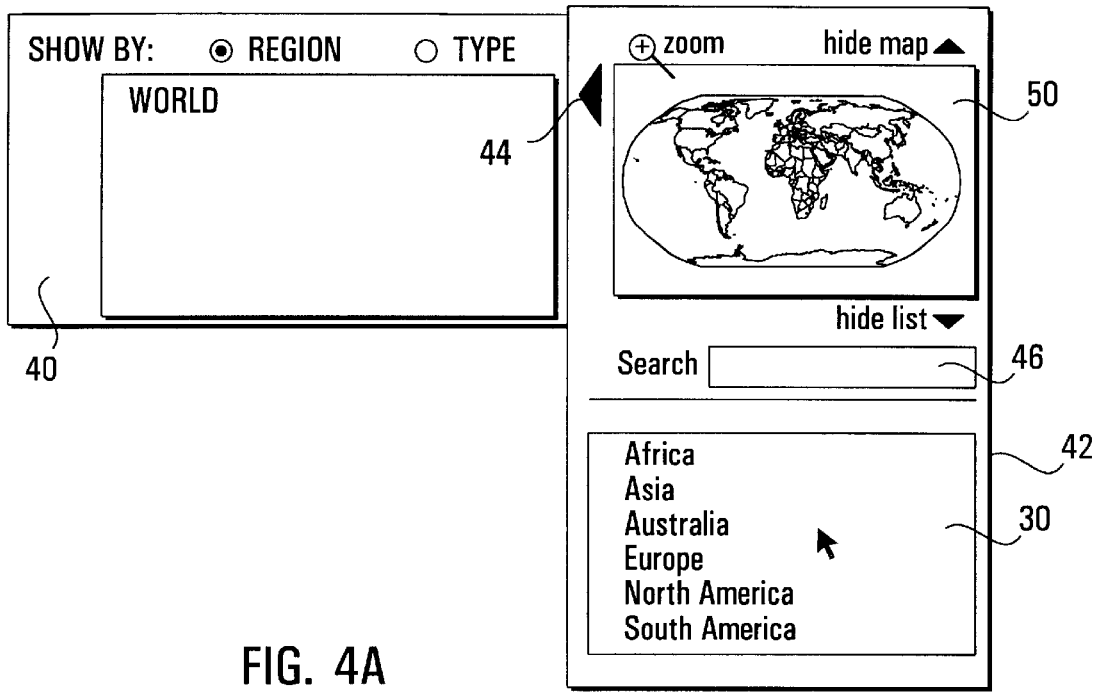

To move to the next level in the hierarchy, a file folder from the list of contents 22 can be selected. A sequence of selections which results in the display of FIG. 3 is displayed in FIGS. 4A–4E. In FIG. 4A, the list of child file folders 30 contained in "WORLD" is displayed. Selection of the file folder "NORTH AMERICA" results in the display of FIG. 4B which is a list of child file folders 32 contained in "NORTH AMERICA". The selection of "CANADA" in FIG. 4B results in the display of FIG. 4C which is a list of child file folders 34 contained in "CANADA". The selection of "ONTARIO" in FIG. 4C results in the display of FIG. 4D which is a list of child file folders 36 contained in "ONTARIO". The selection of "CENTRAL ONTARIO" in FIG. 4D results in the display of FIG. 4E which is a list of child file folders 38 contained in "CENTRAL ONTARIO". The selection of "TORONTO" in FIG. 4E results in the display of previously described FIG. 3 which includes a list of files contained in "TORONTO". In each case, upon selection of a file folder in the list of contents previously displayed, the selected file folder is added to the display of the direct containment hierarchy, (or alternatively the direct containment hierarchy is redrawn to include the selected file folder) and the contents of the newly selected child file folder are displayed in place of the list of contents previously displayed for the previously selected file folder.

In a preferred embodiment, as in the illustrated examples, the direct containment hierarchy is displayed on a first window 40, and the list of contents is displayed in a second window 42. The two windows 40,42 are preferably displayed adjacent to each other, or with the second window partially overlapping the first. The display of the second window 42 has an arrow 44 pointing to the file folder in the direct containment hierarchy whose contents are listed in the list of contents 22.

Figure 7:
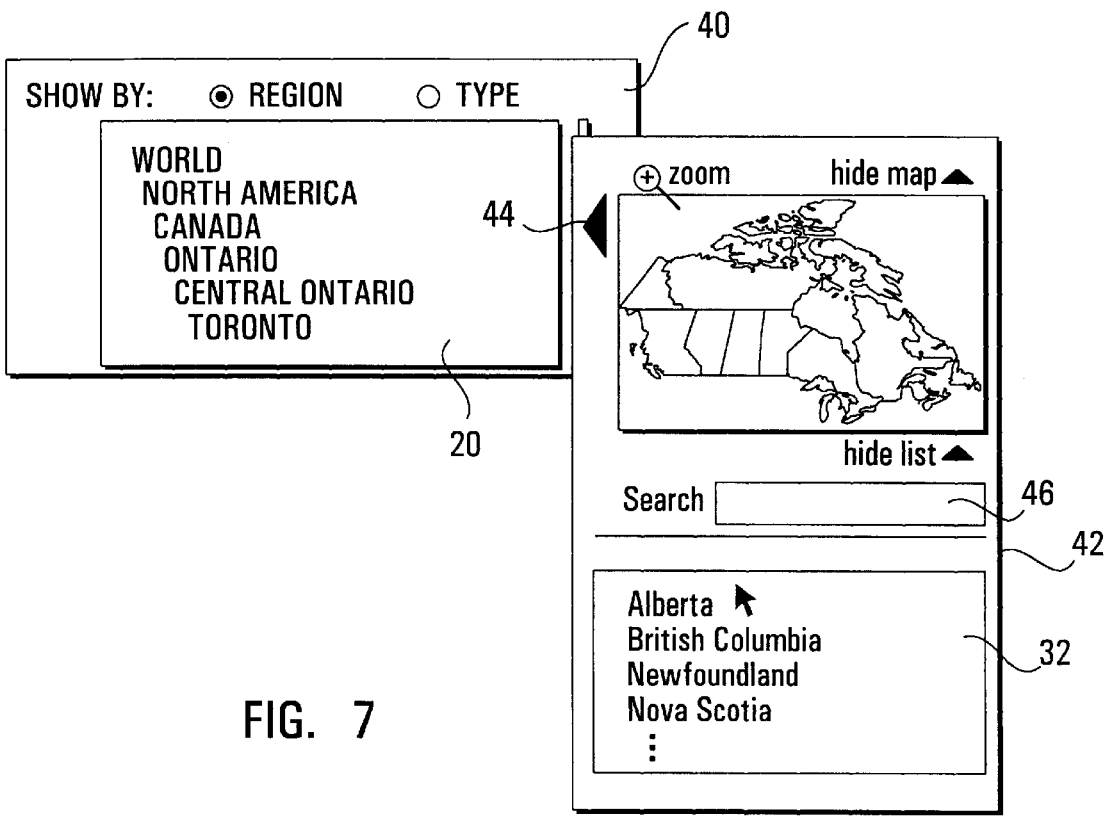
FIG. 7 is an example of another way of manipulating the containment hierarchy according to an embodiment of the invention.

In a preferred embodiment, the arrow 44 can be dragged or otherwise controlled with a user input device, for example a mouse, such that it points to any level in the displayed direct containment hierarchy 20. When such is done, the second window 42 moves up with the arrow 44, and the list of contents 22 is updated to show the contents of the file folder pointed to by the arrow at a given time. For example, in FIG. 7 after navigating down to the "TORONTO" file folder arrow 44 has been dragged up to point at "CANADA". The remainder of the direct containment hierarchy 20 below "CANADA" is still displayed. Should a user select one of the file folders in the list of contents 32, then the direct containment hierarchy 20 would be updated by adding this new entry below "CANADA", and by deleting the remainder of the direct containment hierarchy from the display. While an arrow 44 is shown as the mechanism for jumping up to a previously selected level in the direct containment hierarchy, it is to be understood that other mechanisms for achieving this may alternatively be employed. For example, by clicking within the direct containment hierarchy 20 with a mouse on the level of interest, by dragging the entire window 42, or any other suitable mechanism.

Preferably, upon temporary indication of a direct containment group in the direct containment hierarchy, for example by mousing over the direct containment group or by using the above described arrow mechanism, the contents of the temporarily selected containment group are temporarily displayed without updating the direct containment hierarchy. Upon actual selection of a direct containment group in the direct containment hierarchy, for example by double clicking on the direct containment group, the contents of the selected containment group are displayed and the direct containment hierarchy is updated such that the selected direct containment group is now the lowest-level containment group.

A search window 46 may be provided which allows a user to enter a textual search criterion. The system in response to such an entry performs a search of the file names in the currently displayed list of contents and displays any matching results. Any searching technique may be employed to this end including any one of many existing well known techniques.

Figure 4B:
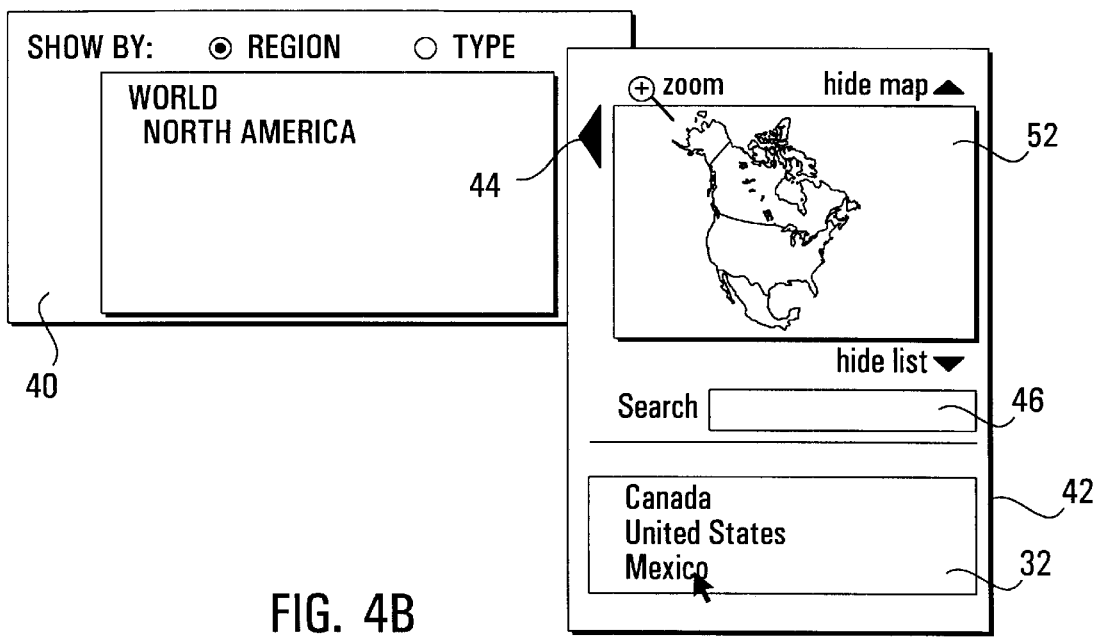
Figure 4C:
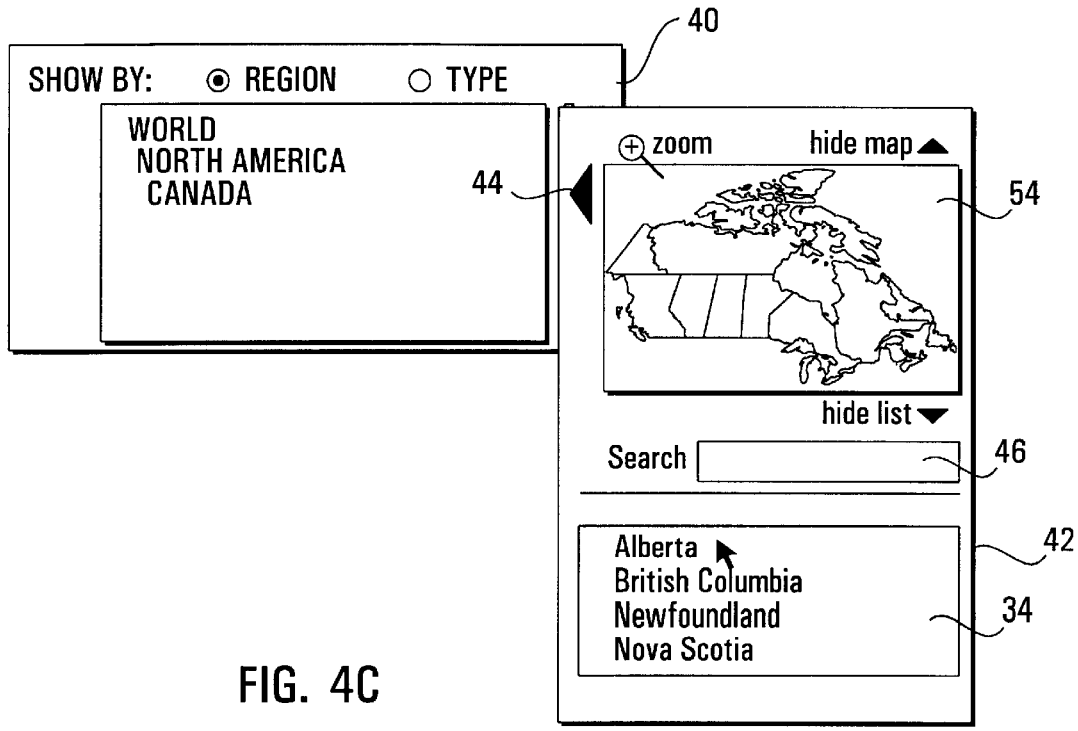
Figure 4D:
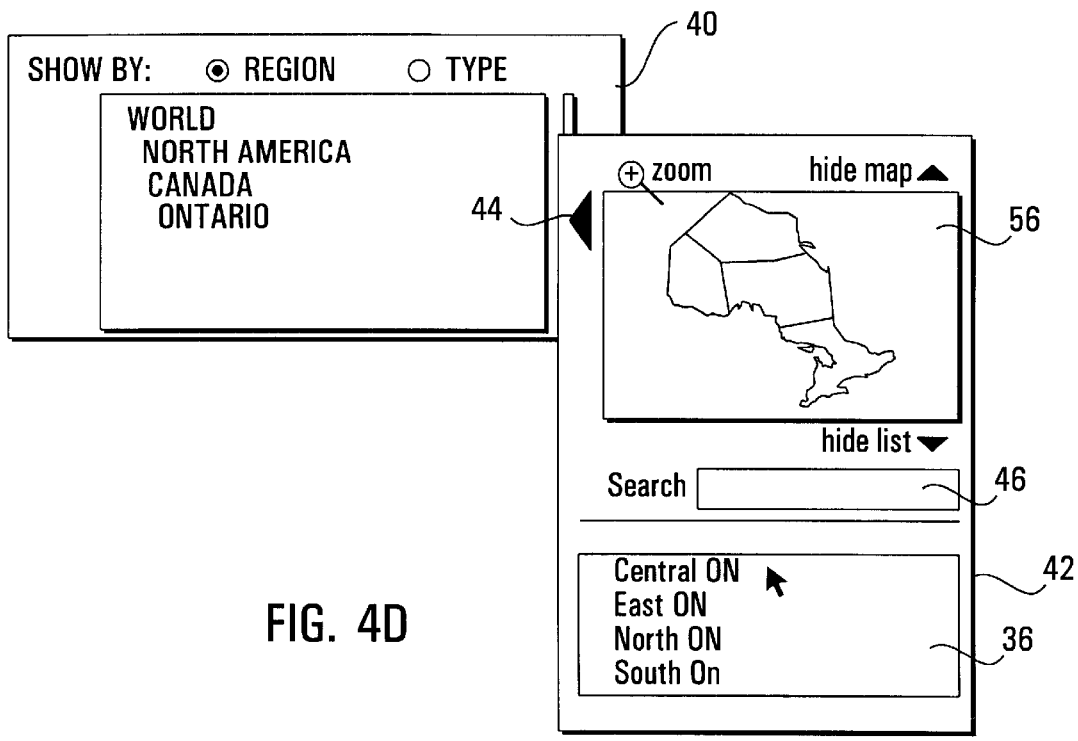
Figure 4E:
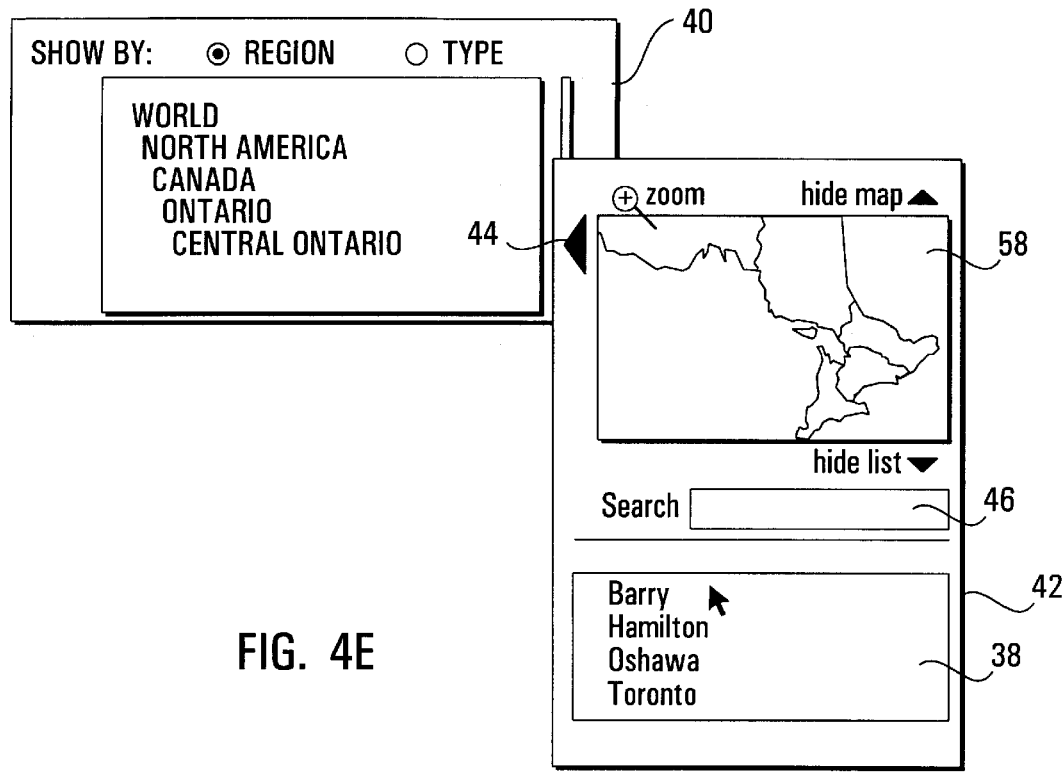

Preferably, a pictorial representation of the contents of the selected file folder is provided. Referring again to FIG. 3, in this example, a pictorial representation 48 consisting of a map corresponding to the name of the selected file folder is provided as part of the second window 42. Thus, in FIG. 4A, a map 50 of the world is shown. In FIG. 4B, a map 52 of North America is shown. In FIG. 4C, a map 54 of Canada is shown. In FIG. 4D, a map 56 of Ontario is shown. In FIG. 4E, a map 58 of Central Ontario is shown, and in FIG. 3, a map 48 of Toronto is shown. This is particularly appropriate for the example at hand in which all of the file folders have names which have geographical connotations. However, it may also be suitable to perform such pictorial representations for other containment hierarchies. Preferably, the pictorial representation is done in a manner which allows the selection of a file or file folder from the list of contents by clicking on the pictorial representation. For example, Canada is displayed in FIG. 4C, and a user knowing where Ontario is could click directly on Ontario to select the file folder "ONTARIO". Preferably, it is user selectable to hide the pictorial representation and/or to hide the list of contents. In the illustrated example of FIG. 3, a "hide map" screen switch 47 is provided which when selected redraws the display without the map and shows a screen switch "show map" in place of the "hide map" screen switch. Similarly, a "hide list" screen switch 49 may be provided.

Figure 8:
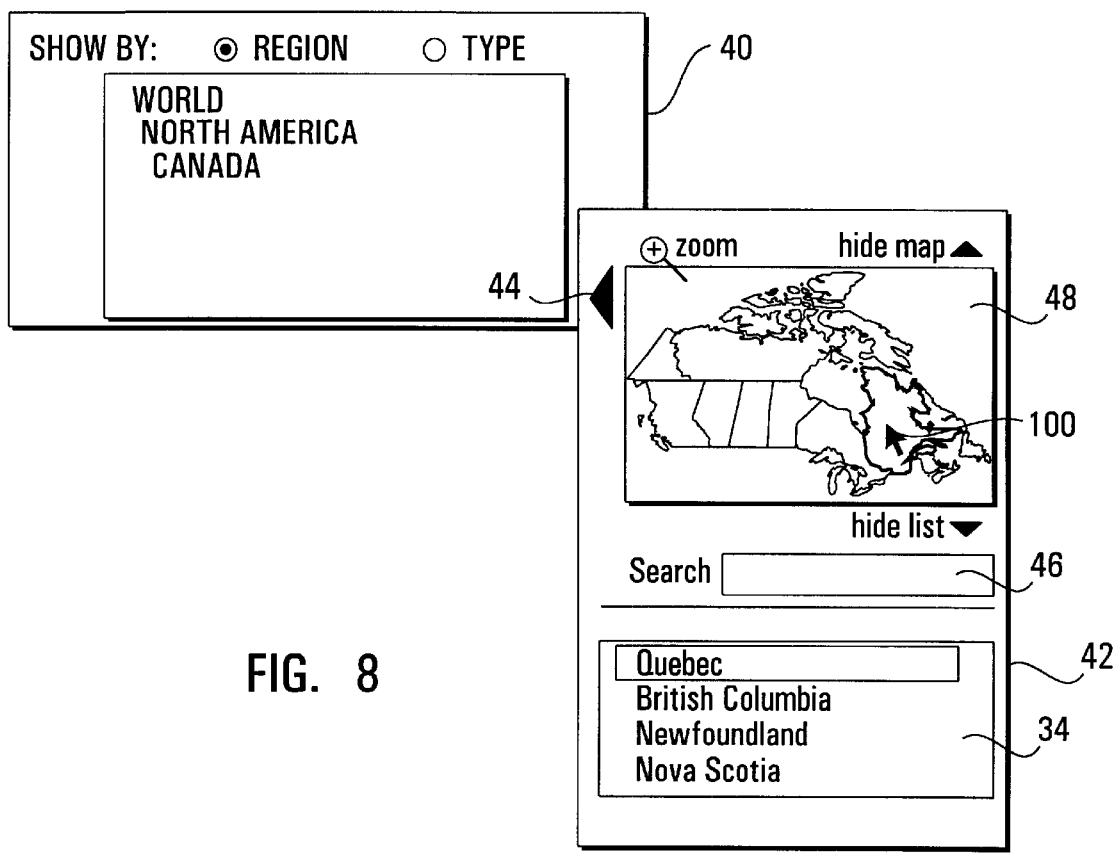
FIG. 8 is an example of a containment hierarchy according to embodiments of the invention in which a pictorial representation is used to allow control over a list of contents.

In a preferred embodiment, when a pictorial representation of the selected file folder is displayed as part of the second window, different pictorial elements in the pictorial representation will represent the list of contents 32. For example, in FIG. 8, the list of contents consists of a list of provinces, and the pictorial representation 48 is a map of Canada illustrating the different provinces. Preferably, by "mousing over" the pictorial representation, i.e. by moving a mouse over the pictorial representation but not clicking on anything, the name of the element currently being displayed is brought to the top of the list of contents 34. In the example of FIG. 8, as indicated by mouse pointer 100 a user has moused over the pictorial element for Quebec, namely the portion of the map of Canada 48 representing Quebec, with the result that Quebec has been brought to the top of the list of contents 34. Preferably, when a particular pictorial element has been moused over, a halo or other highlighting effect is added to the display to make it clear to a user which pictorial element is being moused over at a given time. Preferably, the listing which is brought to the top of the list of contents 34 is highlighted or otherwise distinguished from the remainder of the list.

In a preferred embodiment, the invention provides for a choice between different hierarchies for the same set of entities. For example, in a hierarchy of file folders and files, the only real physical entities are the files, while the file folders are just logical groupings. While these logical groupings may make sense for one user, they may not make sense for another user. According to the invention, a method is provided which permits a user to select between different containment hierarchies. For this embodiment, collectively somewhere in either the computer system, software, or storage devices, the various different hierarchies must be stored. Preferably, a screen switch is provided on the display which allows a user to switch between the different available containment hierarchies. Preferably, an option exists to switch between the display of different hierarchies for a given file entity. In the illustrated embodiment of FIG. 3, an area 80 of the display contains two screen switches 82,84 which are individually selectable with a mouse for example. Screen switch 82 selects that a "Region" containment hierarchy be used in displaying the direct containment hierarchy, and this has been selected for the examples. Screen switch 84 selects that a "Type" containment hierarchy be used in displaying the direct containment hierarchy.

Figure 5:
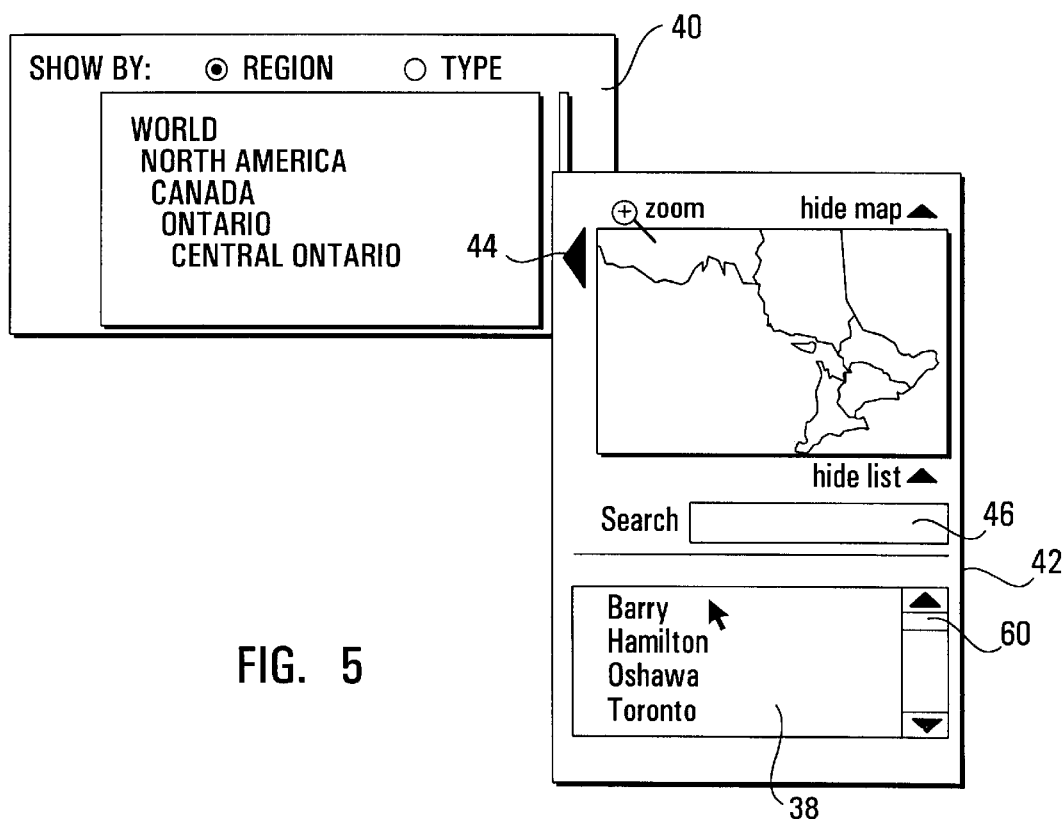
FIG. 5 is an example of a containment hierarchy according to an embodiment of the invention in which the list of contents is scrollable.

In a preferred embodiment, the list of contents is displayed scrollably. An example of this is shown in FIG. 5 which is a version of FIG. 4E which illustrates a list of contents 38 displayed with scroll bars 60. Other methods of providing scrollability can be provided, such as configuring the arrow keys to move up and down through the list of contents for example.

Figure 6:
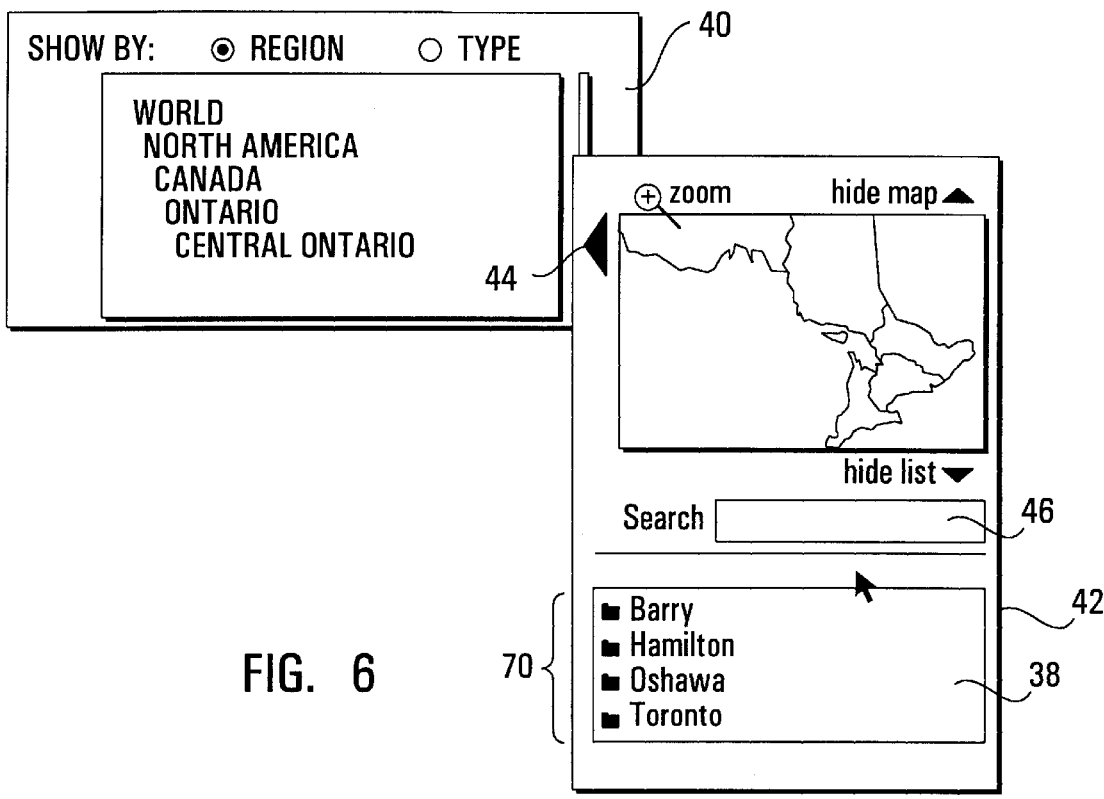
FIG. 6 is an example of a containment hierarchy according to an embodiment of the invention in which a distinguishment has been made between various types of contents.

In another preferred embodiment, the list of contents is displayed in a manner which distinguishes between various types of contents, for example to distinguish between file folders and files. An example of this is shown in FIG. 6 which is a version of FIG. 4E. The file folders in the list of contents 38 of FIG. 4E are indicated as such by including a small pictorial file folder 70 beside them. Any suitable icons or indicators could be used to identify other types of entities.

The above described embodiments have focused mainly on a method in a computer system for displaying a selected file folder. In addition, an embodiment of the invention also provides for a software program containing software which when run will implement one or more of the above discussed methods, stored on a computer readable medium. Another embodiment of the invention provides a computer system per se adapted to implement one or more of the above discussed methods. Furthermore, in another embodiment, a graphical user interface is provided which has been adapted to implement one or more of the above discussed methods. Furthermore, in another embodiment, an operating system is provided which has been adapted to implement one or more of the above discussed methods, the operating system preferably being a Windows-based operating system.

The above described embodiments have focussed on file folders and files. More generally the invention can be applied to any containment hierarchy having any type of containment groups and any type of containment entity. In this case, an embodiment of the invention displays a direct containment hierarchy of containment groups and a list of contents for the lowest-level containment group. For example, a containment hierarchy could be used to represent components in a network. In this case, each containment group would identify some type of grouping of other containment groups or of network elements per se. Other examples include way-finding tools, telephone directories and Internet site navigators to name a few.

Where the illustrated examples have featured the use of two windows, it is to be understood that more generally two areas of any suitable definition may be used.

Numerous modifications and variations of the present invention are possible in light of the above teachings. It is therefore to be understood that within the scope of the appended claims, the invention may be practised otherwise than as specifically described herein.

We claim:

1. A method in a computer system, comprising:
    displaying a direct containment hierarchy having hierarchical containment groups of at least two containment levels one of the hierarchical containment groups being a lowest level containment group; and
    concurrently displaying a list of contents only of the lowest level containment group;
    wherein each containment group is a file folder;
    wherein said direct containment hierarchy is displayed in a first area and said list of contents is displayed in a second area.

2. A method according to claim 1 wherein said displaying list of contents is done scrollably.

3. A method according to claim 1 wherein said second area is displayed adjacent to or partially overlapping with the first area.

4. A method according to claim 1 further comprising:
    upon entry of a search criterion, searching the list of contents for any listings which match the search criterion and displaying any such listing.

5. A method according to claim 1 further comprising:
    displaying a pictorial representation of the list of contents.

6. A method according to claim 5 wherein the pictorial representation is a map.

7. A method according to claim 6 wherein said map is a geographical map.

8. A method according to claim 5 wherein said pictorial representation includes a pictorial element for each listing in said list of contents.

9. A method according to claim 1 further comprising displaying said list of contents m a manner which distinguishes between various types of contents.

10. A method according to claim 9 wherein said various types of contents comprise file folders and files.

11. A method according to claim 9 wherein displaying the direct containment hierarchy comprises displaying a sequence of nth file folders, wherein n-1, . . . , K, where K is the containment depth of the lowest-level file folder, where for any n the nth file folder is a file folder which directly contains the (n-1)th file folder.

12. A method according to claim 1 wherein displaying the direct containment hierarchy comprises displaying a list inclusively containing only file folders which directly or indirectly contain the lowest-level file folders.

13. A method according to claim 1 wherein said one of said containment groups is user selectable.

14. A method according to claim 1 further comprising:
    upon temporary selection of a direct containment group in the direct containment hierarchy, temporarily displaying the contents of the temporarily selected containment group without updating the direct consent hierarchy.

15. A method according to claim 1 further comprising:
    upon selection of a selected containment group in the direct containment hierarchy, modifying the direct containment hierarchy to extend down to the selected containment group;
    displaying the contents of the selected containment group in place of the list of contents.

16. A method in a computer system, comprising:
    displaying a direct containment hierarchy having hierarchical containment groups of at least two containment levels one of the hierarchical containment groups being a lowest level containment group; and
    concurrently displaying a list of contents only of the lowest level containment group;
    wherein each containment group is a file folder;
    the method further comprising:
        upon selection of a child file folder in the list of contents of the lowest-level folder, in place of the previous direct containment hierarchy displaying a new direct containment hierarchy which includes the newly selected child file folder;
        displaying the contents of the newly selected child file folder in place of the list of contents.

17. A method in a computer system, comprising:
    displaying a direct containment hierarchy having hierarchical containment groups of at least two containment levels one of the hierarchical containment groups being a lowest level containment group; and
    concurrently displaying a list of contents only of the lowest level containment group;
    the method further comprising:
        displaying a pictorial representation of the list of contents;
        wherein said pictorial representation includes a pictorial element for each listing in said list of contents;
        wherein upon a user identifying a particular pictorial element in the display, the method alters We display of that particular pictorial element to highlight the fact that it has been indicated, and a corresponding listing in the list of contents is moved to the top of the list of contents.

18. A method in a computer system, comprising:
    displaying a first direct containment hierarchy based on a first containment hierarchy, the first containment hierarchy having at least two hierarchical containment groups of at least two containment levels, one of the hierarchical containment groups being a lowest level containment group;

concurrently with displaying the first direct containment hierarchy, displaying a list of contents only of the lowest level containment group in said fit direct containment hierarchy;

receiving an input indicating to change to a second containment hierarchy;

displaying in place of said first direct containment hierarchy a second direct containment hierarchy based on the second containment hierarchy, containment hierarchy having at least two hierarchical containment groups of at least two containment levels, one of the hierarchical containment groups being a lowest level containment group;

concurrently with displaying the second direct containment hierarchy, displaying a list of contents only of the lowest level containment group in said second direct containment hierarchy.

19. A method according to claim 18 further comprising:

setting the lowest-level containment group in said second direct containment hierarchy to contain a selected containment entity in the lowest-level containment group in said first direct containment hierarchy.

20. A system comprising:

a processing platform connected to a storage device and a display;

the system being adapted to:
  display a direct containment hierarchy having hierarchical containment groups of at least two containment levels one of the hierarchical containment groups being a lowest level containment group; and
  concurrently display a list of contents only of the lowest level containment group;
  wherein each containment group is a file folder;
  wherein said direct containment hierarchy is displayed in a first area and said list of contents is displayed in a second area.

21. A graphical user interface adapted to:

display a direct containment hierarchy having hierarchical containment groups of at least two containment levels one of the hierarchical containment groups being a lowest level containment group; and concurrently display a list of contents only of the lowest level containment group;

wherein each containment group is a file folder;

wherein said direct containment hierarchy is displayed in a first area and said list of contents is displayed in a second area.

22. An operating system adapted to:

display a direct containment hierarchy having hierarchical containment groups of at least two containment levels one of the hierarchical containment groups being a lowest level containment group; and concurrently display a list of contents only of the lowest level containment group;

wherein each containment group is a file folder;

wherein said direct containment hierarchy is displayed in a first area and said list of contents is displayed in a second area.

23. A computer readable medium having computer executable code stored thereon for implementing a method comprising:

display a direct containment hierarchy having hierarchical containment groups of at least two containment levels one of the hierarchical containment groups being a lowest level containment group; and concurrently display a list of contents only of the lowest level containment group;

wherein each containment group is a file folder;

wherein said direct containment hierarchy is displayed in a first area and said list of contents is displayed in a second area.

24. A method in a computer system, comprising:

displaying a direct containment hierarchy having hierarchical containment groups of at least two content levels one of the hierarchical containment groups being a lowest level containment group; and concurrently displaying a list of contents only of the lowest level containment group;

the method further comprising:
  displaying a pictorial representation of the list of contents;
  wherein said pictorial representation includes a pictorial element for each listing in said list of contents;

the method further comprising:
  upon selection of a particular pictorial element, in place of the previous direct containment hierarchy displaying a new direct containment hierarchy which includes the child file folder corresponding with the particular pictorial element;
  displaying the contents of the child file folder corresponding with the particular pictorial element in place of the list of contents.

* * * * *

UNITED STATES PATENT AND TRADEMARK OFFICE
CERTIFICATE OF CORRECTION

PATENT NO.   : 6,691,282 B1
DATED        : February 10, 2004
INVENTOR(S)  : Suzanne L. Rochford et al.

It is certified that error appears in the above-identified patent and that said Letters Patent is hereby corrected as shown below:

Column 7,
Line 64, correct "...m a manner..." to read -- ...in a manner... --.

Column 8,
Line 56, correct "...alters We..." to read -- ...alters the... --.

Column 9,
Line 3, correct "...said fit..." to read -- ...said first... --.

Column 10,
Line 29, correct "...two content..." to read -- ...two containment... --.

Signed and Sealed this

Tenth Day of August, 2004

JON W. DUDAS
*Acting Director of the United States Patent and Trademark Office*